(12) United States Patent
Sardiñas

(10) Patent No.: US 12,363,102 B2
(45) Date of Patent: Jul. 15, 2025

(54) SMART VERIFICATION OF AUTHENTICATION FOR USER LOG INS BASED ON RISK LEVELS

(71) Applicant: Fortinet, Inc., Sunnyvale, CA (US)

(72) Inventor: Adonis Sardiñas, Hialeah, FL (US)

(73) Assignee: Fortinet, Inc., Sunnyvale, CA (US)

(*) Notice: Subject to any disclaimer, the term of this patent is extended or adjusted under 35 U.S.C. 154(b) by 436 days.

(21) Appl. No.: 17/710,264

(22) Filed: Mar. 31, 2022

(65) Prior Publication Data

US 2023/0319028 A1 Oct. 5, 2023

(51) Int. Cl.
*H04L 9/40* (2022.01)
*G06F 21/31* (2013.01)

(52) U.S. Cl.
CPC ........ *H04L 63/0838* (2013.01); *G06F 21/316* (2013.01); *G06F 2221/2111* (2013.01)

(58) Field of Classification Search
CPC ..... H04L 63/0838; H04L 9/40; G06F 21/316; G06F 2221/2111; G06F 21/31
See application file for complete search history.

(56) References Cited

U.S. PATENT DOCUMENTS

| | | | |
|---|---|---|---|
| 9,213,814 B2 * | 12/2015 | Grigg | H04L 63/10 |
| 9,967,267 B2 | 5/2018 | Ladnai et al. | |
| 9,984,224 B1 * | 5/2018 | Johnson | H04W 12/068 |
| 10,791,097 B2 | 9/2020 | Ortner et al. | |
| 11,277,416 B2 | 3/2022 | Ray et al. | |
| 2015/0089568 A1 * | 3/2015 | Sprague | H04L 63/0838 726/1 |
| 2016/0248781 A1 * | 8/2016 | Grigg | H04L 63/0823 |
| 2020/0374121 A1 * | 11/2020 | Momchilov | H04L 9/0825 |
| 2021/0152537 A1 * | 5/2021 | Bengani | H04L 63/123 |

FOREIGN PATENT DOCUMENTS

EP 3701732 B1 * 2/2021 ......... H04L 63/0428
WO WO-2023244602 A1 * 12/2023

* cited by examiner

*Primary Examiner* — Jayesh M Jhaveri
(74) *Attorney, Agent, or Firm* — Law Office of Dorian Cartwright; Dorian Cartwright

(57) ABSTRACT

Failures in authentication credentials are detected by a user prior to presentation of successful credentials. Responsive to the authentication credentials failure, a geo-location for a new geo-location of the user is checked. Responsive to a new location detection, expiration of a verification link is detected. Responsive to failure of the link verification, a failure of a token OTP verification is detected. Access is granted responsive to successful verification. Access can be granted to a digital asset or a physical asset.

13 Claims, 5 Drawing Sheets

SMART VERIFICATION OF AUTHENTICATION FOR USER LOG INS BASED ON RISK LEVELS

FIELD OF THE INVENTION

The invention relates generally to computer networking, and more specifically, for verification level of credentials based on risk when accessing a resource.

BACKGROUND

Log in security is critical to maintaining trust in online transactions. Credentialing is required by IEEE 802.11 and other standards when a new station connects to a private network. A user interface is presented to complete the query-response log in process with a user.

Once a password and username have been compromised, malicious actors can access and damage a user's assets protected by the password. For example, one person may eavesdrop to find out another person's credentials. Automated hack robots can use blunt force to repetitively attempt different username and password combinations.

Therefore, what is needed is a robust technique for verification level of credentials based on risk when accessing a resource.

SUMMARY

These shortcomings are addressed by the present disclosure of methods, computer program products, and systems for verification level of credentials based on risk when accessing a resource.

In one embodiment, a failure in authentication credentials is detected by a user prior to presentation of successful credentials. Responsive to the authentication credentials failure, a geo-location for a new geo-location of the user is checked. Responsive to a new location detection, expiration of a verification link is detected. Responsive to failure of the link verification, a failure of a token OTP verification is detected.

In another embodiment, access is granted responsive to successful verification. Access can be granted to a digital asset or a physical asset.

Advantageously, network performance is improved with better network security.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for verification level of credentials based on risk when accessing a resource.

One of ordinary skill in the art will recognize many additional variations made possible by the succinct description of techniques below.

I. Systems for Credential Verification (FIGS. 1-2)

Figure 1:
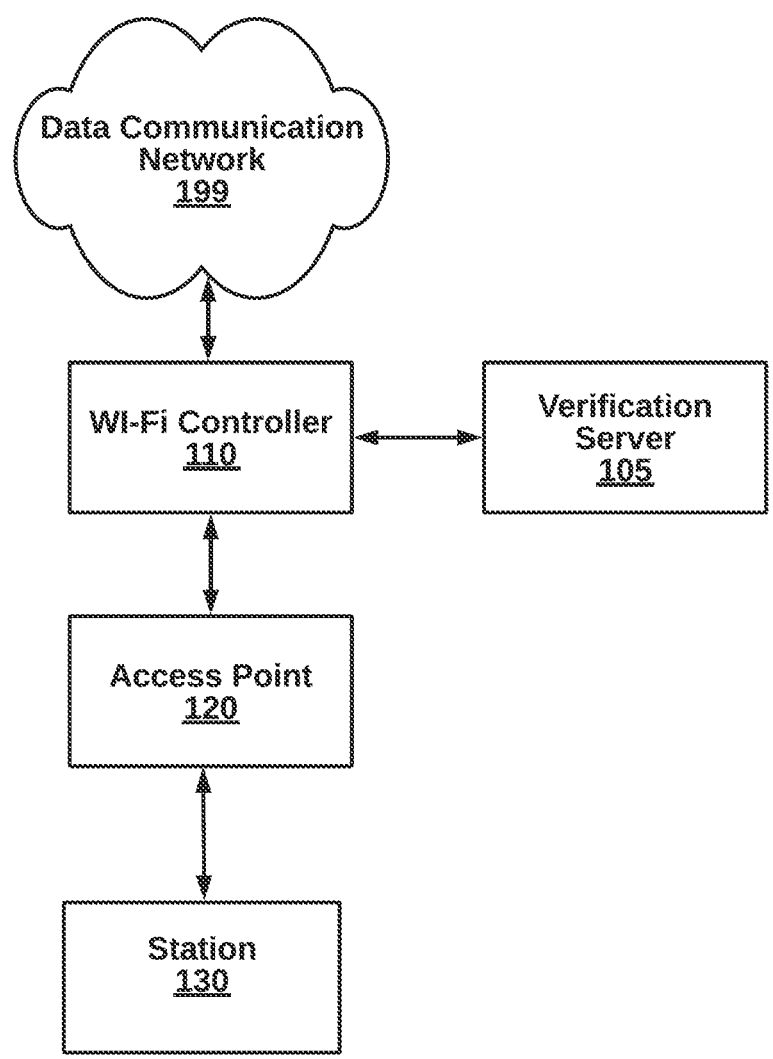
FIG. 1 is a block diagram illustrating a system for verification level of credentials based on risk when accessing a resource, according to an embodiment.
Figure 2:
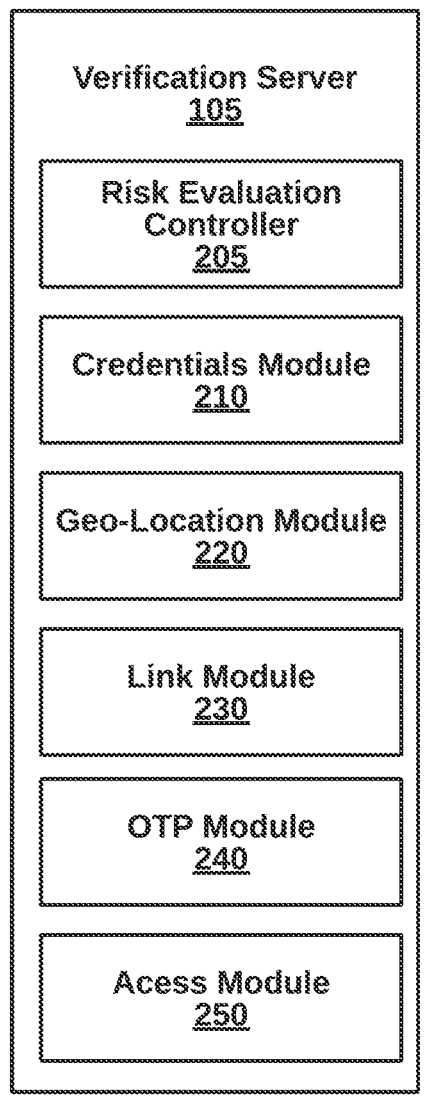
FIG. 2 is a more detailed block diagram illustrating a verification server of the system of FIG. 1, according to an embodiment.

FIG. 1 is a block diagram illustrating a system 100 for verification level of credentials based on risk when accessing a resource, according to an embodiment. The system 100 includes a verification server 105, a Wi-Fi controller 110, an access point 120 and a station 130, coupled to a data communication network 199. Many other configurations are possible, for example, with additional network components such routers, switches, repeaters, firewalls, and the like. Also, there can be many more or fewer clients in FIG. 1. The system components can be implemented in computer devices with non-transitory source code, such as set forth below with reference to FIG. 5.

The components of the system 100 are coupled in communication over the data communication network. The components can be connected to the data communication system via hard wire. The data communication network 199 can be any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802,11r, and the like including IPv4, IPv6, or other protocols.

The verification server 105 controls log in access as triggered by log in anomalies indicative of increased risk, such as failed credentials. Risk levels, measurements of risk, and risk actions are implementation-specific with many variations within the spirit of the present disclosure. In one embodiment, retries of authentication or verification at one level triggers an additional level of interrogation, once retries are successful. Due to risk, ultimately access can be blocked, a user/device can be quarantined, or a log entry is generated for offline analysis. The verification server 105, in some embodiments, is integrated into a Wi-Fi controller, a network gateway, a RADIUS server, or the like. Additional embodiments of the device identification server 105 are disclosed below with regard to FIG. 2.

The station 130 presents log in credentials when joining the private network. Other contexts of log ins include accessing an online account, online financial transactions, and the like. A user at the station 130 can provide credentials through a keyboard or an app can fill in credential automatically at a log in screen. For example, username and password may be requested. Other log in data can include telephone numbers, email addresses, social security numbers, and the like. If the user correctly verifies, access is granted to the station and/or user.

The access point 120 connects the station 130 to the backhaul network once authentication credentials and verifications have been satisfied. As an endpoint, the access point 120 passes data packets between the station 130 and the verification server 105 during the log in process. In one case, a quarantine LAN or quarantine SSID is used to host stations with limited access until log ins are verified, and stations are transferred to an operating LAN or operating SSID. The access point 120 can initiate the log in process and also be notified of success or failure.

The Wi-Fi controller 110 manages the station 130 as it roams between different access points within the private network. When associating the network, the Wi-Fi controller 110 can use historical connections in the authentication and verification process. For instance, credentials can be automatically provided by the Wi-Fi controller 110 for a roaming station that is newly connecting but has already passed scrutiny.

FIG. 2 is a more detailed block diagram illustrating an IPS module 110 of the file sharing system of FIG. 1, according to an embodiment. The opportunistic key engine 110 includes a risk evaluation controller 205, a credentials module 210, a geo-location module 220, a link module 230, an OTP module 240, and an access module 250. The modules can be implemented in source code stored in non-transitory memory executed by a processor. Alternatively, the modules can be implemented in hardware with microcode. The modules can be singular or representative of functionality spread over multiple components. Many other variations are possible.

In operation, a risk evaluation controller 205 orchestrates verification and risk assessment. A failure in authentication credentials by a user prior to presentation of successful credentials, to initiate the verification process. Additional layers of verification can be added or removed on the fly based on a current risk, and logs can be marked to draw attention to network administrators during review. The risk evaluation controller 205 also maintains a risk score as verification are failed and passed under different circumstances (e.g., 10 second SMS link verification versus 10-minute SMS link verification).

The geo-location module 220, responsive to an authentication credentials failure, checks a geo-location for a new geo-location of the user. The link module 230, responsive to a new location detection, detects expiration of a verification link. The OTP module 240, responsive to failure of the link verification, detects a failure of a token OTP verification. Finally, the access module 250 can grant access to resource.

II. Methods for Credentials Verification (FIGS. 3-4)

Figure 3:
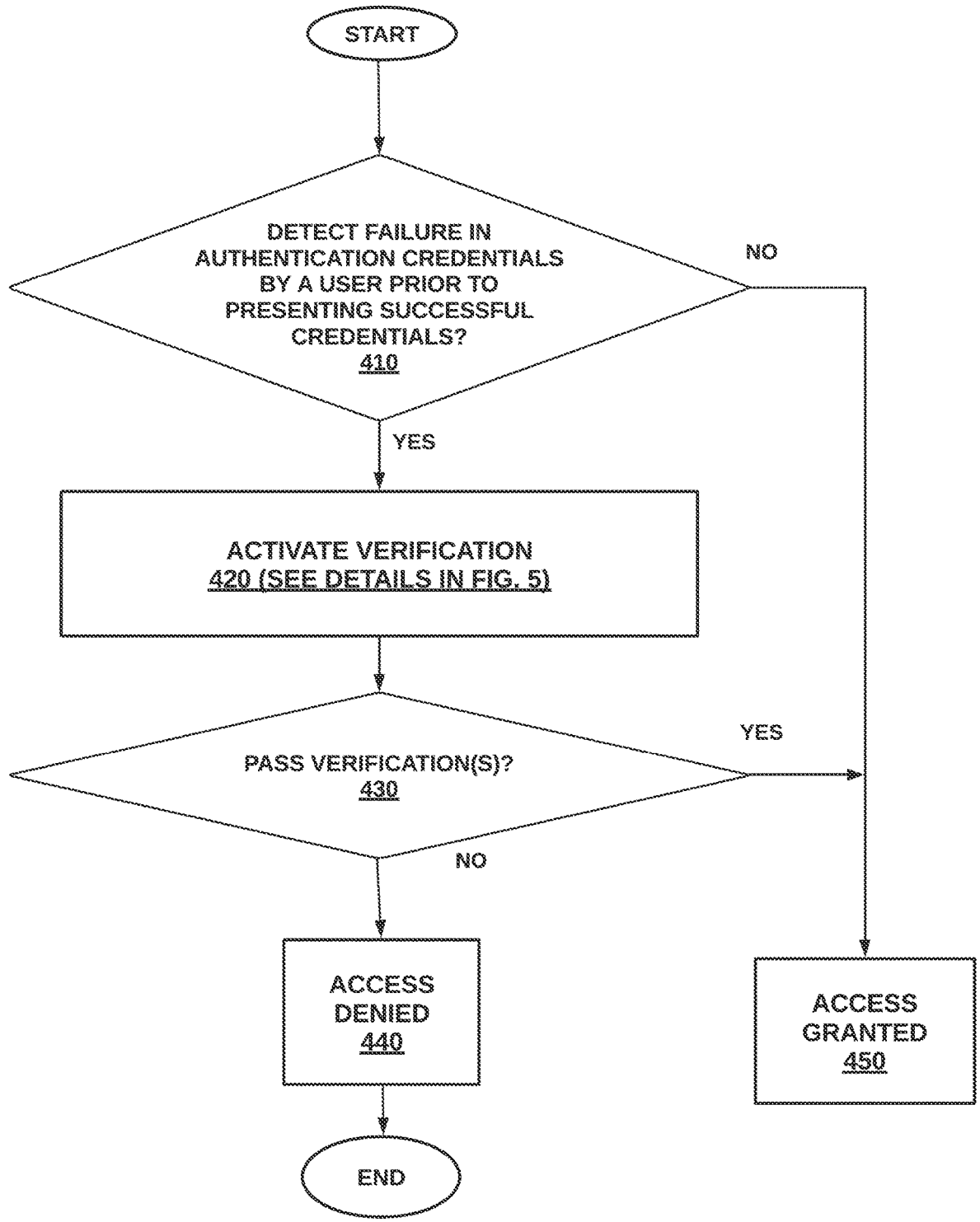
FIG. 3 is a high-level flow diagram illustrating a method for verification level of credentials based on risk when accessing a resource, according to one preferred embodiment.
Figure 4:
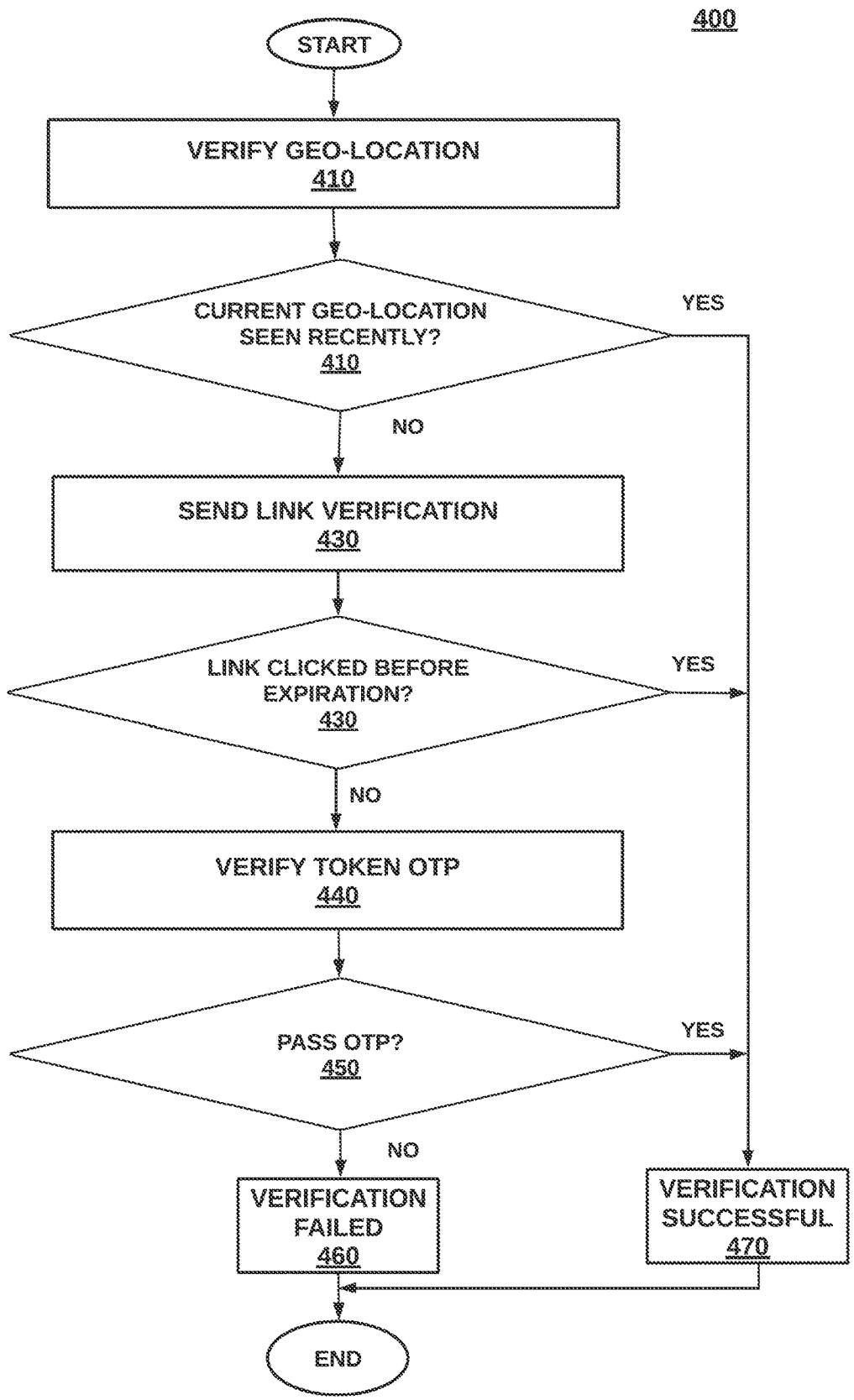
FIG. 4 is a more detailed flow diagram illustrating the step of verification of log in, for the method of FIG. 3, according to one embodiment.

FIG. 3 is a high-level flow diagram illustrating a method for verification level of authentication based on risk when accessing a resource, according to an embodiment. The method 300 can be implemented, for example, by the system 100. The steps are merely representative groupings of functionality, as there can be more or fewer steps, and the steps can be performed in different orders. Many other variations of the method 300 are possible.

At step 310, a credentials module to detect a failure in authentication credentials by a user prior to presentation of successful credentials. There may have been 1 or more retries of credential presentation after failures. In other embodiments, the authentication failure is a biometric authentication failure (e.g., fingerprints, voice, or eyes).

At step 320, responsive to an authentication credentials failure, verification of the user is activated. As shown in FIG. 4, at step 410, a geo-location of the current session is checked for a new geo-location of the user. A cache of recent log ins can be maintained for 1 day, 30 days, or the like. At step 420, responsive to a new location detection a verification link is sent out (e.g., (via email or via SMS). Expiration of a verification link is detected if no click-through is completed. At step 430, responsive to failure of the link verification, an OTP token is sent to the user. A failure of a token OTP verification can be detected.

Returning to FIG. 3, at step 330, access to a resource is granted responsive to passing verification. Other embodiments update a recent location cache with a location of the successful log in.

III. Generic Computing Environment (FIG. 5)

Figure 5:
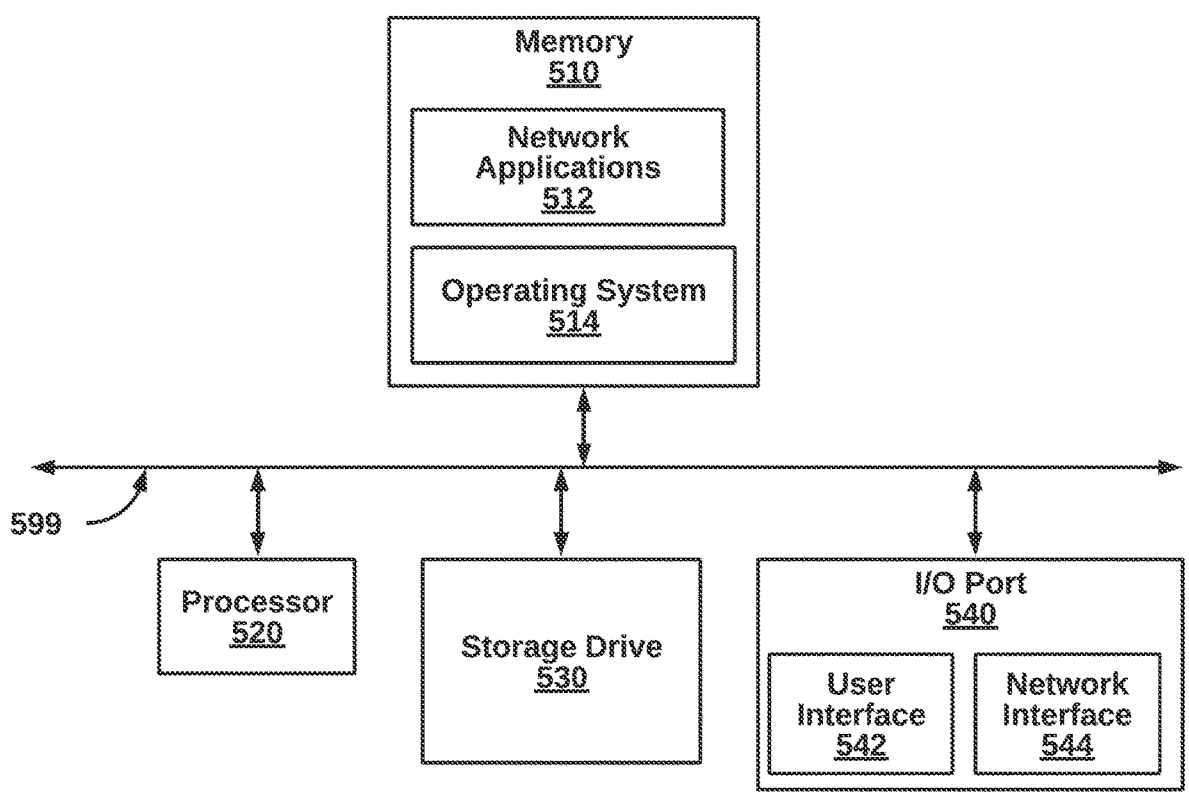
FIG. 5 is a high-level block diagram illustrating a computing device as an example hardware implementation of network devices herein, according to an embodiment.

FIG. 5 is a block diagram illustrating a computing device 500 capable of implementing components of the system, according to an embodiment. The computing device 500, of the present embodiment, includes a memory 510, a processor 520, a storage drive 530, and an I/O port 540. Each of the components is coupled for electronic communication via a bus 599. Communication can be digital and/or analog and use any suitable protocol. The computing device 500 can be any of components of the system 100 (e.g., log in server 105, Wi-Fi controller 110, access point 120, and station 130), other networking devices (e.g., an access point, a firewall device, a gateway, a router, or a wireless station), or a disconnected device.

Network applications 512 can be network browsers, daemons communicating with other network devices, network protocol software, and the like. An operating system 514 within the computing device 500 executes software, processes. Standard components of the real OS environment 514 include an API module, a process list, a hardware information module, a firmware information module, and a file system. The operating system 514 can be FORTIOS, one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The storage drive 530 can be any non-volatile type of storage such as a magnetic disc, EEPROM (electronically erasable programmable read-only memory), Flash, or the like. The storage drive 530 stores code and data for applications.

The I/O port 540 further comprises a user interface 542 and a network interface 544. The user interface 542 can output to a display device and receive input from, for example, a keyboard. The network interface 544 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A network device coupled to a data communication network and to an enterprise network, for verification of credentials based on risk, the network device comprising:
   a processor;
   a network interface communicatively coupled to the processor and communicatively coupled to exchange data packets over the data communication network; and
   a memory communicatively coupled to the processor and storing:
      a credentials module configured to detect a failure in authentication credentials by a user prior to presentation of successful credentials;
      a geo-location module configured to, responsive to the detected authentication credentials failure, check a geo-location for a new geo-location of the user;
      a link module configured to, responsive to the new geo-location detection, check for expiration of a verification link;
      an OTP (One Time Password) module configured to, responsive to expiration of the link verification, check for a failure of a token OTP verification; and
      an access module to grant access to the user responsive to successful verification of the link or the token OTP.

2. The network device of claim 1, wherein a credentials module does not detect a failure in authentication credentials by a user prior to presentation of successful credentials, and in response, the access module grants access without additional verification.

3. The network device of claim 1, wherein the geo-location module does not detect a new location, and in response, the access module grants access without additional verification.

4. The network device of claim 1, wherein the link module to, responsive to detecting a known location detection, the access module grants access without additional verification.

5. The network device of claim 1, wherein the OTP module to, responsive to a successful link verification, the access module grants access without additional verification.

6. The network device of claim 1, wherein the geo-location module determines the new geo-location of the user from the Internet Protocol (IP) address associated with the user.

7. The network device of claim 1, wherein the geo-location module adds a new location to the database with a time stamp.

8. The network device of claim 1, wherein the link verification comprises at least one of an SMS link and an e-mail link.

9. The network device of claim 1, wherein the access module grants access to a digital asset or a physical asset.

10. A method in a network device communicatively coupled to a data communication network including a Wi-Fi network with a plurality of stations, for identifying new devices connecting to the enterprise network using randomized MAC addresses, the method comprising the steps of:
   detecting a failure in authentication credentials by a user prior to presentation of successful credentials;

responsive to the detected authentication credentials failure, checking a geo-location for a new geo-location of the user;

responsive to the new geo-location detection, check for expiration of a verification link;

responsive to expiration of the link verification, checking for a failure of a token OTP (One Time Password) verification; and granting access responsive to successful verification of the link or the token OTP.

11. A non-transitory computer-readable medium storing source code in a network device communicatively coupled to a data communication network including a Wi-Fi network with a plurality of stations, that when executed by a processor, performs a method for identifying new devices connecting to the enterprise network using randomized MAC addresses, the method comprising the steps of:

detecting a failure in authentication credentials by a user prior to presentation of successful credentials;

responsive to the detected authentication credentials failure, checking a geo-location for a new geo-location of the user;

responsive to the new geo-location detection, detecting expiration of a verification link;

responsive to failure of the link verification, detecting a failure of a token OTP verification; and granting access responsive to successful verification of the link or the token OTP.

12. The network device of claim 1, wherein the access module facilitates a move of the station from a quarantine SSID used prior to verification to a non-quarantine SSID used after the successful verifications.

13. The network device of claim 1, wherein a Wi-Fi controller provides historical connection information with other network devices of the enterprise network for at least part of the verifications.

* * * * *